United States Patent
Liu et al.

(10) Patent No.: US 10,437,397 B2
(45) Date of Patent: Oct. 8, 2019

(54) CAPACITIVE TOUCHSCREEN AND MANUFACTURING METHOD THEREOF

(71) Applicant: SHENZHEN ROYOLE TECHNOLOGIES CO. LTD, Shenzhen (CN)

(72) Inventors: Zihong Liu, Shenzhen (CN); Xiaojun Yu, Shenzhen (CN); Peng Wei, Shenzhen (CN); Xiang Zou, Shenzhen (CN); Yu Zhou, Shenzhen (CN); Xin Chen, Shenzhen (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 151 days.

(21) Appl. No.: 15/548,913

(22) PCT Filed: Feb. 6, 2015

(86) PCT No.: PCT/CN2015/072450
§ 371 (c)(1),
(2) Date: Aug. 4, 2017

(87) PCT Pub. No.: WO2016/123807
PCT Pub. Date: Aug. 11, 2016

(65) Prior Publication Data
US 2018/0032172 A1    Feb. 1, 2018

(51) Int. Cl.
*G06F 3/044* (2006.01)
*G02F 1/1333* (2006.01)
(Continued)

(52) U.S. Cl.
CPC ............ *G06F 3/044* (2013.01); *G02F 1/1343* (2013.01); *G02F 1/13338* (2013.01);
(Continued)

(58) Field of Classification Search
CPC ............... G02F 1/1343; G02F 1/13338; G02F 1/136286; G06F 2203/04103; G06F 2203/04104; G06F 3/044
See application file for complete search history.

(56) References Cited

U.S. PATENT DOCUMENTS

| | | |
|---|---|---|
| 8,502,796 B1 | 8/2013 | Yilmaz |
| 2010/0117985 A1 | 5/2010 | Wadia |

(Continued)

FOREIGN PATENT DOCUMENTS

| | | |
|---|---|---|
| CN | 202649986 U | 1/2013 |
| CN | 103218099 A | 7/2013 |

(Continued)

*Primary Examiner* — Muhammad N Edun
(74) *Attorney, Agent, or Firm* — Hauptman Ham, LLP

(57) ABSTRACT

A capacitive touchscreen includes a substrate and a transparent conductive layer arranged on the substrate. The conductive layer includes a sensing area. The sensing area has a first side and a second side opposite to the first side. The capacitive touchscreen further includes multiple transparent and conductive first electrodes, multiple transparent and conductive second electrodes, and transparent and nonconductive patterns. Each first electrode includes a first trunk extending from the first side toward the second side. Each second electrode includes a second trunk and a wiring coupled to the second trunk. Both the second trunk and the wiring extend from the first side toward the second side, and each second trunk cooperates with a corresponding first trunks to be operable to sense a touched position. The transparent and nonconductive patterns are located between the first and second electrodes to electrically isolate the first electrodes from the second electrodes.

24 Claims, 7 Drawing Sheets

(51) Int. Cl.
*G02F 1/1343* (2006.01)
*G02F 1/1362* (2006.01)

(52) U.S. Cl.
CPC .............. *G02F 1/136286* (2013.01); *G06F 2203/04103* (2013.01); *G06F 2203/04104* (2013.01)

(56) References Cited

U.S. PATENT DOCUMENTS

| | | | |
|---|---|---|---|
| 2012/0113344 A1* | 5/2012 | Kim | G02F 1/13338 349/41 |
| 2014/0152921 A1* | 6/2014 | Yashiro | G06F 3/044 349/12 |
| 2014/0168536 A1 | 6/2014 | Guo et al. | |
| 2014/0198268 A1* | 7/2014 | Sugita | G06F 3/044 349/12 |
| 2014/0204290 A1 | 7/2014 | Chen et al. | |
| 2014/0210784 A1 | 7/2014 | Gourevitch et al. | |
| 2014/0319381 A1 | 10/2014 | Gross | |
| 2014/0340596 A1 | 11/2014 | Kim | |
| 2015/0029129 A1 | 1/2015 | Trend et al. | |
| 2015/0236047 A1* | 8/2015 | Kim | H01L 27/124 345/174 |

FOREIGN PATENT DOCUMENTS

| | | |
|---|---|---|
| CN | 203276241 U | 11/2013 |
| CN | 104111758 A | 10/2014 |
| CN | 104182081 A | 12/2014 |
| GB | 2506347 A | 4/2014 |
| JP | 2011524032 A | 8/2011 |
| JP | 2012169081 A | 9/2012 |
| JP | 2012174578 A | 9/2012 |
| JP | 2013222590 A | 10/2013 |
| JP | 3191207 U | 6/2014 |
| KR | 10-2011-0007220 A | 1/2011 |
| KR | 10-1448094 B | 10/2014 |
| KR | 20-2014-0005271 U | 10/2014 |
| TW | 201442081 A | 11/2014 |

* cited by examiner

CAPACITIVE TOUCHSCREEN AND MANUFACTURING METHOD THEREOF

TECHNICAL FIELD

The present disclosure relates to touchscreens, and particularly to a capacitive touchscreen and a method for manufacturing the same.

BACKGROUND

Currently, capacitive touchscreens become an indispensible element of electronic products such as cellphones, tablet computers, notebook computers, and so on. In order to realize multi-point touch, common structures of the capacitive touchscreens include a single-layer bridge structure and a double-layer structure. The capacitive touchscreen with the single-layer bridge structure has a relatively complex technology, while the capacitive touchscreen with the double-layer structure has relatively large thickness due to the need of stacking. Therefore, it is necessary to provide a capacitive touchscreen with a simple technology and small thickness.

SUMMARY

Embodiments of the present disclosure provide a capacitive touchscreen and a method for manufacturing the same, which can solve the above technical problems.

A capacitive touchscreen may include a substrate and a transparent and conductive layer arranged on the substrate. The transparent and conductive layer may include a sensing area, and the sensing area has a first side and a second side opposite to the first side. The capacitive touchscreen may further include multiple transparent and conductive first electrodes, multiple transparent and conductive second electrodes, and transparent and nonconductive patterns. Each of the first electrodes may include a first trunk extending from the first side toward the second side. Each of the second electrodes may include a second trunk and a wiring coupled to the second trunk, both the second trunk and the wiring extend from the first side toward the second side, and each of the second trunks cooperates with a corresponding first trunk to be operable to sense a touched position. The transparent and nonconductive patterns are located between the first electrodes and the second electrodes to electrically isolate the first electrodes from the second electrodes.

A method for manufacturing a capacitive touchscreen may include: providing a substrate; arranging a transparent and conductive layer having a sensing area on the substrate, the sensing area having a first side and a second side opposite to the first side; setting laser parameters such that laser is operable to change the transparent and conductive layer to be transparent and nonconductive without removing the transparent and conductive layer; setting movement parameters so that the laser is movable according to a path defined by the movement parameters; and enabling the laser to irradiate the sensing area to form nonconductive patterns thereon, according to the laser parameters and the movement parameters, multiple transparent and conductive first electrodes and second electrodes being formed in the sensing area due to the nonconductive patterns isolating the first electrodes from the second electrodes. Each of the first electrodes may include a first trunk extending from the first side toward the second side. Each of the second electrodes may include a second trunk and a wiring coupled to the second trunk, and both the second trunk and the wiring extending from the first side toward the second side. Each of the second trunks cooperates with a corresponding first trunk to be operable to sense a touched position.

In the present disclosure, since one conductive layer is used to manufacture the capacitive touchscreen, the manufacturing process is simple, and the thickness is also relatively small.

BRIEF DESCRIPTION OF THE DRAWINGS

The following accompanying drawings are intended to illustrate various embodiments of the present disclosure in detail in combination with specific embodiments. It is to be understood that various elements shown in the drawings are not representative of actual sizes or scaling relationship, but are merely schematic views shown for clear illustration, and shall not to be construed as limiting the present disclosure.

DETAILED DESCRIPTION

In order to make clearer the object, technical solutions, and advantages of the present disclosure, below the present disclosure is further described in detail in combination with the embodiments and the accompanying drawings. It shall be understood that the specific embodiments described herein are merely used to illustrate the present disclosure but not to limit the present disclosure.

The present disclosure provides a capacitive touchscreen and a method for manufacturing the same. In the following embodiments, firstly the method for manufacturing the capacitive touchscreen will be described, however, in the process of description, a structure of the capacitive touchscreen also needs to be mentioned to better explain the method for manufacturing the same, Therefore, the structure of the capacitive touchscreen will not be independently described separately from its manufacturing method in the present specification, while a person skilled in the art can clearly know the structure of the capacitive touchscreen according to the description of the manufacturing method.

Figure 1:
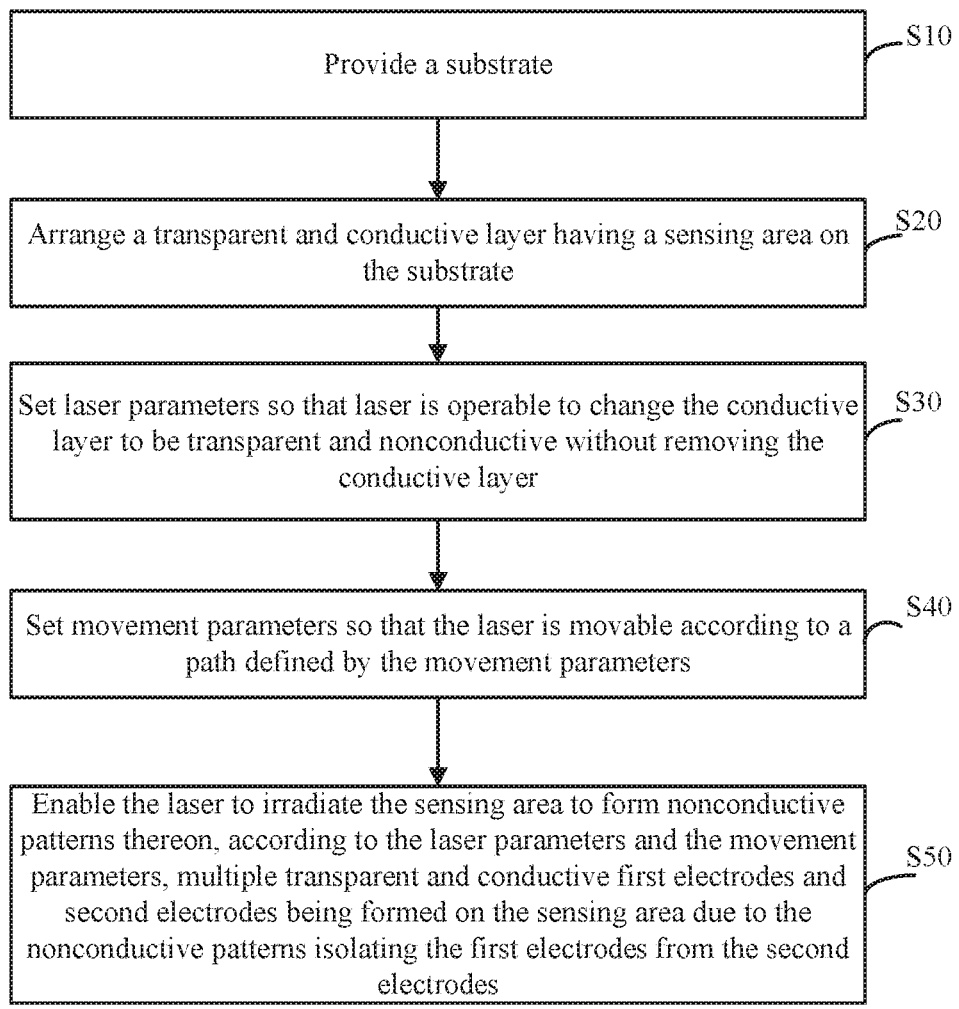
FIG. 1 is a flow chart of a method for manufacturing a capacitive touchscreen according to a first embodiment of the present disclosure.
Figure 2:
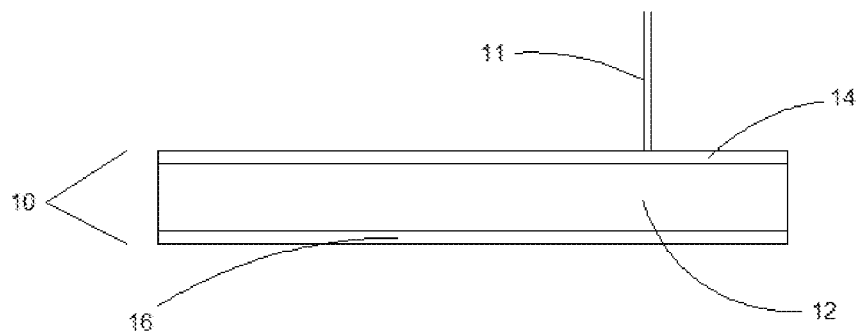
FIG. 2 is a lateral schematic view showing laser irradiating a nano-silver thin film arranged on a substrate according to the manufacturing method of FIG. 1.

Referring to FIG. 1, FIG. 1 is a flow chart of a method for manufacturing a capacitive touchscreen provided in an embodiment of the present disclosure. The method will be illustrated in combination with FIG. 2 and FIG. 3. The method may include the following steps.

Step S10: a substrate 12 is provided. The substrate 12 may be made from a transparent material, such as glass or polyethylene terephthalate (PET), so as to facilitate manufacturing a display screen module having a touch function or other application scenarios which require transparency. When the capacitive touchscreen 10 needs to be flexible, PET can be chosen to manufacture the substrate 12. PET has advantages of good light transmittance and flexibility, easiness of manufacture, etc. In the embodiment, the thickness of the substrate 12 made from PET may be about 0.01 to 0.5 millimeter (mm), preferably, 0.015 to 0.2 mm, and more preferably 0.1 mm, and the substrate with such thicknesses has relatively good flexibility. Certainly, in other circumstances where transparency is not needed, other thicknesses also may be chosen for the substrate 12, and the substrate 12 also may be made from a non-transparent material such as metal.

Figure 4:
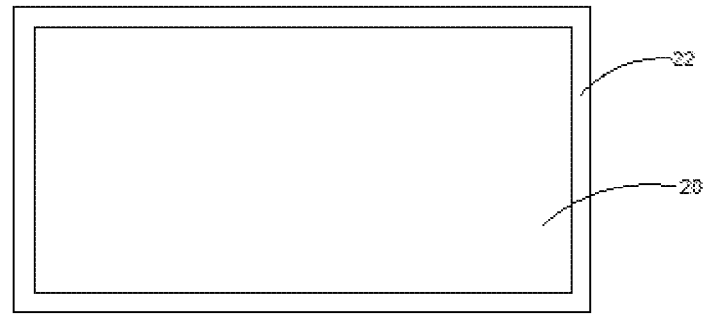
FIG. 4 is a plane view of the capacitive touchscreen manufactured according to the method of FIG. 1.

Step S20: a transparent and conductive nano-silver thin film 14 having a sensing area is arranged on the substrate 12. The nano-silver thin film 14 is a thin film which includes a layer of polymer matrix having nano-silver wires, and the nano-silver wires are distributed in the thin film disorderly and uniformly, thereby enabling the thin film to be transparent and conductive. The sheet resistance of the nano-silver thin film 14 may be about 5-80 Ω/sq, which is greatly reduced compared with ITO. The nano-silver thin film 14 may be attached to the substrate 12 in a manner of coating, screen-printing, or injecting. The substrate 12 and the nano-silver thin film 14 arranged on one surface of the substrate 12 constitute basic elements of the capacitive touchscreen 10. The capacitive touchscreen 10 includes a sensing area 20 (as shown in FIG. 4) located in a central part thereof and made from the nano-silver thin film 14, and the sensing area 20 is used for sensing user's touch. Preferably, the capacitive touchscreen 10 further includes a protecting layer 16 located at a side of the substrate 12 opposite to the nano-silver thin film 14. The protecting layer 16 can be formed by fixing a scratch-resistant material such as polycarbonate material on the substrate 12 in a coating manner.

Step S30: laser parameters are set so that laser 11 is operable to change the nano-silver thin film 14 from being transparent and conductive to be transparent and nonconductive in a non-removal manner. The laser parameters may include pulse width, pulse flux, pulse energy, spot size, pulse repetition rate, etc. In cases where appropriate parameters are chosen, after the nano-silver thin film 14 is irradiated by the laser 11, the nano-silver in the irradiated part is changed from being conductive to be nonconductive, meanwhile, the transparency of the irradiated part almost remains unchanged, moreover, the irradiated part of the nano-silver thin film 14 is almost not peeled off. Since the above process treating the nano-silver wires is available in related art, unnecessary details will not be given herein. It shall be indicated that the delimitation of being conductive and being nonconductive is considered with respect to the fields of printed electronic devices, touch sensing, or photoelectric elements. For example, when the sheet resistance is about 30 to 250 Ω/sq, the thin film 14 may be considered as being conductive, while when the sheet resistance is about 20 MΩ/sq, the thin film 14 may be considered as being nonconductive. However, it shall be understood that in different fields, being conductive and being nonconductive may have different delimitations, and the above laser parameters shall be set according to specific application scenarios.

Step S40, movement parameters are set so that the laser is movable according to a path defined by the movement parameters. The movement parameters may include a scanning speed, a moving path, etc. The scanning speed may be 1 m/s. The moving path practically can be regarded as a pattern. After the laser is moved according to the movement parameters, a region irradiated by the laser will form the pattern. The specific shape of the moving path will be further understood from the description of the following step.

Figure 3:
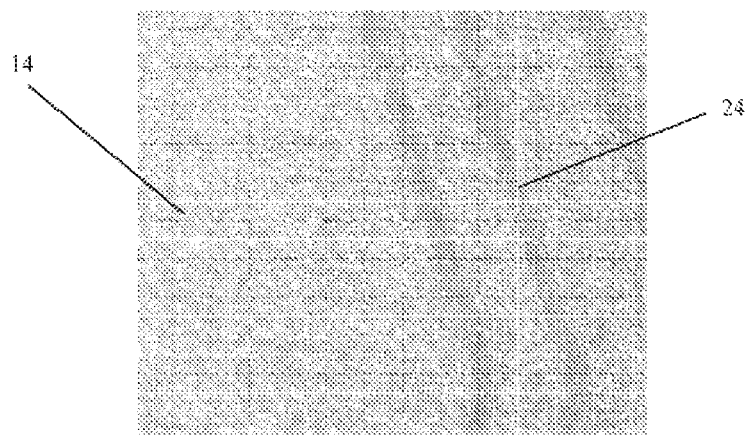
FIG. 3 is a microscopic schematic view showing irradiated parts and non-irradiated parts in some regions of the nano-silver thin film of FIG. 1.

Step S50: the laser is enabled to irradiate the sensing area 20 of the nano-silver thin film 14 according to the laser parameters and the movement parameters, thereby forming nonconductive patterns 24 on the sensing area 20. A part of the nonconductive patterns 24 are shown in FIG. 3. The nonconductive pattern 24 is the part of the nano-silver thin film 14 which becomes transparent and nonconductive after being irradiated by the laser 11 in a non-removal manner. Referring to FIG. 3, FIG. 3 shows a part of the nonconductive patterns 24 and parts at its sides which are not irradiated by the laser 11 in an enlarged view. As shown in FIG. 3, after being magnified by 200 times, it can be seen that the transparency property of the nonconductive pattern 24 is slightly different from that of the conductive part, therefore, the nonconductive pattern 24 and the part which is not irradiated by the laser 11 cannot be distinguished merely by naked eyes without any magnifying tool, which has been proved in actual products, that is to say, the nonconductive pattern 24 after being irradiated by the laser 11 is still transparent.

Figure 5:
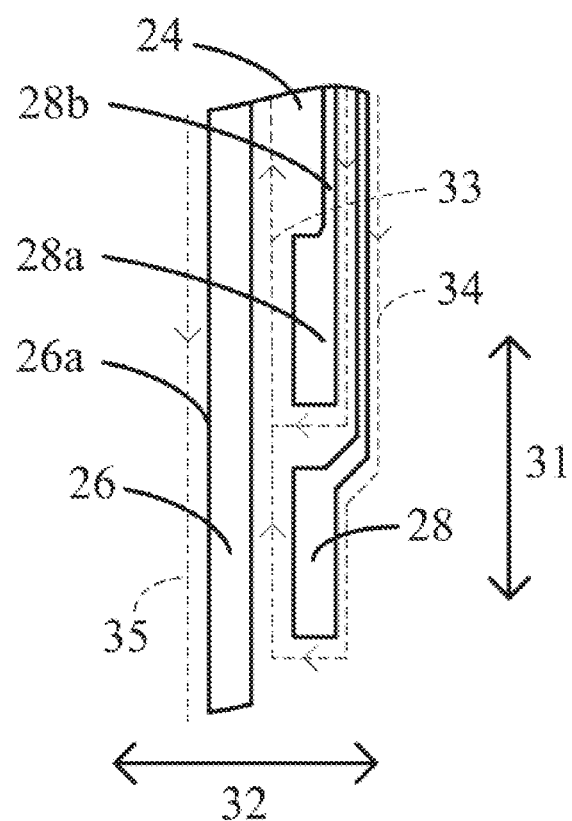
FIG. 5 is an enlarged schematic view of a part of patterns of the capacitive touchscreen of FIG. 4 according to the first embodiment of the present disclosure, the patterns used for sensing a touch operation.

Referring to FIG. 4 and FIG. 5, multiple transparent and conductive first electrodes 26 and second electrodes 28 which are electrically isolated are formed in the sensing area 20 due to the nonconductive patterns 24. The first electrodes 26 and the second electrodes 28 are the parts of the sensing area 20 of the nano-silver thin film 14 which are not irradiated by the laser 11. Each of the first electrodes 26 includes a first trunk 26a extending along a first direction 31 (a vertical direction in FIG. 4). Each of the second electrodes 28 includes a second trunk 28a also extending along the first direction and a wiring 28b coupled to the second trunk 28a. The second trunks 28a are arranged at intervals in the first direction 31. Most of the wirings 28b coupled to the second trunks 28a also extend along the first direction and are arranged at intervals in a second direction 32 (a transverse direction in FIG. 4), and only one end of each wiring 28b adjacent to the corresponding second trunk 28a extends toward the corresponding second trunk 28a to connect therewith. Each of the second trunks 28a cooperates with a corresponding first trunk 26a to be operable to sense a touched position. The width of each of the wirings 28b in the second direction is generally smaller than that of the first trunk 26a and the second trunk 28a.

In the manufacturing process, when manufacturing the first electrodes 26 and the second electrodes 28, for example, a part of the first trunk 26a, a part of the second trunk 28a, and a part of the wiring 28b as shown in FIG. 5, the laser can firstly travel along a dotted line 33 shown in FIG. 5, and a part of the nonconductive pattern corresponding to the dotted line 33 can define one second electrode 28. The laser further travels along a dotted line 34, and another second electrode 28 is then formed. A side of the dotted line 34 adjacent to the first trunk 26a is in contact with the dotted line 33. After enough second electrodes 28 are formed in the same manner, the laser further travels along a dotted line 35, and the first trunk 26a is then formed.

In conventional designs, an ITO thin film has a relatively high sheet resistance, thus the sensing pattern and the overall structure of the touchscreen may be restricted. For example, a touchscreen with an OGS structure usually has a size of less than 6 inches due to the limitation of sheet resistance, and a bigger size will lead to a too high channel resistance, thereby causing problems such as poor remote performance. Compared with the conventional ITO design, the nano-silver thin film with greatly reduced sheet resistance is employed in the present disclosure, therefore, an increased design space is provided for the sensing pattern and the size of the touchscreen, and the restriction of the sheet resistance is greatly reduced.

In addition, since the sheet resistance of the nano-silver thin film 14 is low, when the nano-silver thin film 14 has the same sheet resistance as the ITO thin film, the thickness of the nano-silver thin film is much thinner, therefore, the light transmittance of the nano-silver thin film 14 is also higher. In turn, when the nano-silver thin film 14 has the same light transmittance as the ITO thin film, the sheet resistance of the nano-silver thin film 14 is much lower. Also, the flexibility of the nano-silver thin film 14 is also better than that of the ITO thin film. Furthermore, since the laser substantially travels linearly along the first direction 31 during the process of forming the nonconductive pattern 24, compared with the dense wrinkled shape in the related art, the distance that the laser travels is greatly reduced, thus improving the manufacturing efficiency.

However, it shall be understood that in other embodiments, it is not limited to the nano-silver thin film for forming the first and second electrodes, while other transparent and conductive metal thin films of nano dimension also can be used, including thin films formed by a single metal of nano dimension, alloy of nano dimension, metal compound of nano dimension, or any combination thereof. For example, apart from thin films of nano-metal wire, thin films of nano-metal particles, and thin films of nano-metal grids also can be included. Certainly, the transparent and conductive layer may be formed from a grapheme thin film, a carbon nanotube thin film, an organic conductive high-molecular polymer thin film, or any combination thereof. The process for manufacturing a touchscreen using these materials is similar to the above process, which will not be described redundantly in the present disclosure. In the present disclosure, since one conductive layer is used for manufacturing the capacitive touchscreen, the manufacturing process is simple, and the thickness is relatively small.

Figure 6A:
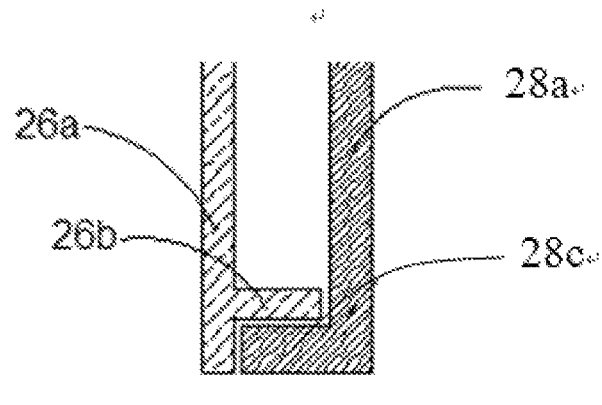
FIG. 6a to FIG. 6c are enlarged schematic views of a part of patterns of a capacitive touchscreen according to second to fourth embodiments of the present disclosure.
Figure 6B:
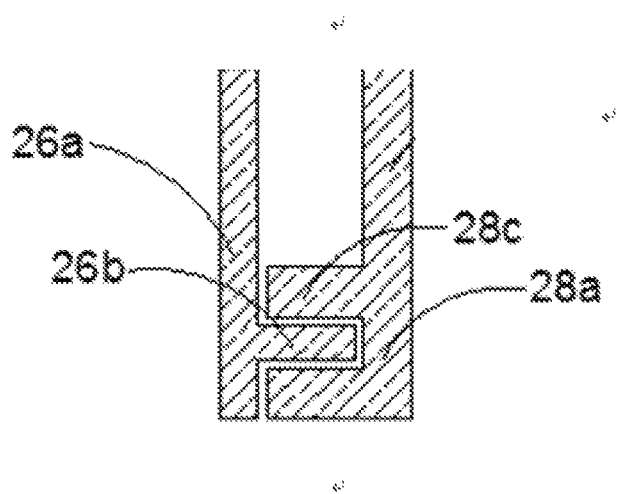
Figure 6C:
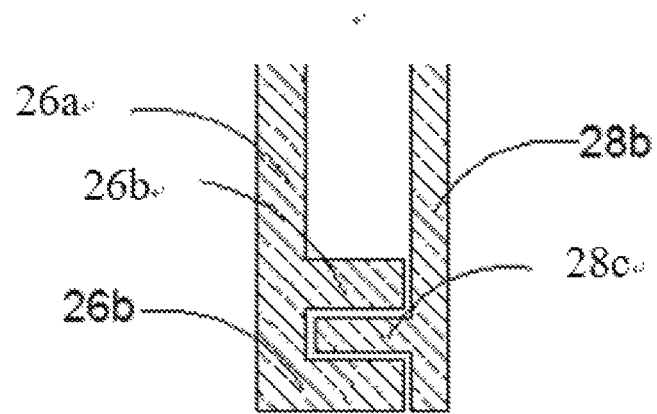

Referring to FIG. 6a, FIG. 6a is an enlarged schematic view of a part of patterns of a capacitive touchscreen provided in a second embodiment of the present disclosure. It is different from the first embodiment mainly in that the first electrode further includes multiple first branches 26b extending from the first trunk 26a along the second direction, each of the second electrodes further includes a second branch 28c extending from the second trunk 28a along the second direction, and the second branches 28c and the first branches 26b are arranged at intervals in the first direction. In the embodiment of FIG. 6a. each of the second electrodes 28 has one second branch 28c, and the first electrode 26 is provided with one first branch 26b corresponding to one second electrode 28. However, it shall be understood that the number of the branches is not limited to the above embodiment, for example, each of the second electrodes may have two second branches located at two sides of the first branch 26b, as shown in FIG. 6b. For another example, when each of the second electrodes 28 has one second branch 28c, the first electrode is provided with two first branches 26b located at two sides of the second branch 28c corresponding to each second electrode, as shown in FIG. 6c. Alternatively, other numbers and combinations are also available, which will not be listed herein.

Figure 7:
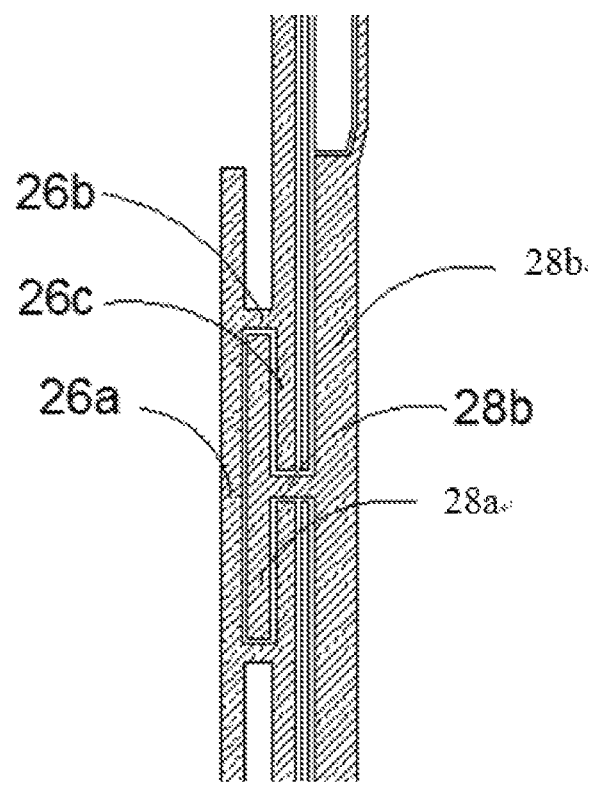
FIG. 7 is an enlarged schematic view of a part of patterns of a capacitive touchscreen according to a fifth embodiment of the present disclosure.

Referring to FIG. 7, FIG. 7 is an enlarged schematic view of a part of patterns of a capacitive touchscreen provided in a fifth embodiment of the present disclosure. It is different from the first embodiment mainly in that the first electrode further includes multiple first branches 26b extending from the first trunk 26a along the second direction and multiple third branches 26c respectively extending from distal ends of the corresponding first branches 26b along the first direction. The second trunk 28a is at least partially located between the corresponding third branch 26c and the first trunk 26a. Preferably, the first trunk 26a, the adjacent first branch 26b, and the adjacent third branch 26c partially surround the second trunk 28a, and the wiring 28b is coupled to the second trunk 28a through a gap defined between adjacent third branches 26c. In the embodiment, the third branch 26c and the first branch 26b substantially form a T shape. The first trunk 26a, the second trunk 28a, the third branches 26c, and most of the wirings 28b extend along a straight line in the first direction 31, which can also achieve the object of improving the manufacturing efficiency.

It shall be indicated that in the multiple embodiments described above, the first and second directions are not limited to the vertical direction and the transverse direction perpendicular to the vertical direction as shown in the figures. In other embodiments, what is needed is that an angle is defined between the two directions.

Figure 8:
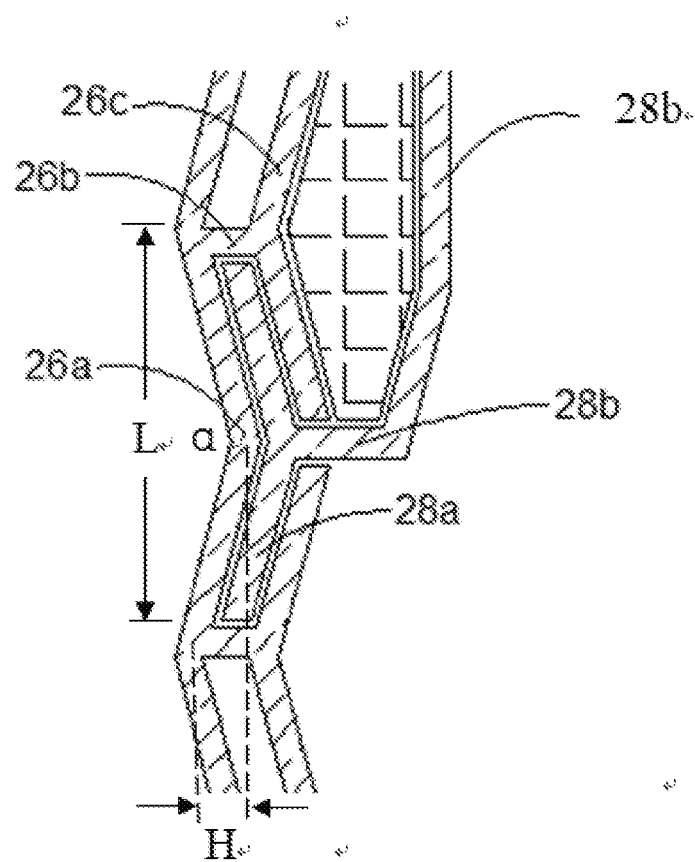
FIG. 8 is an enlarged schematic view of a part of patterns of a capacitive touchscreen according to a sixth embodiment of the present disclosure.

Referring to FIG. 8, FIG. 8 is an enlarged schematic view of a part of patterns of a capacitive touchscreen provided in a sixth embodiment of the present disclosure. It is different from the fifth embodiment mainly in that in the extending route from one side (an upper side in FIG. 8) of the capacitive touchscreen 10 to the opposite other side (a lower side in FIG. 8), the first trunks 26a, the second trunks 28a, the third branches 26c, and most of the wirings 28b extend along slightly-bent broken lines rather than straight lines.

Within one unit length L, the first trunk 26a is bent once, i.e., it can be abstracted that the first trunk 26a is formed by two segments defining an angle therebetween, thereby forming a substantially V-shape zigzag line, and the distance between two ends forming an opening of the zigzag line is also of one unit length L. The unit length L may be larger than 1 mm and less than 15 mm, i.e., may be in a range of (1 mm, 15 mm), preferably, (3 mm, 8 mm), more preferably, (4 mm, 7 mm), further preferably, (4.5 mm, 6 mm), for example, the unit length L may be 4.7 mm, 5.0 mm, or 5.5 mm. A distance H between a highest point and a lowest point of the zigzag line in the second direction may be larger than 0 and less than 0.866 L, and preferably may be in a range of (0, 0.5 L), more preferably (0, 0.2887 L). further preferably (0, 0.134 L), for example, the distance H may be 0.088 L, or 0.044 L. An angle α defined between the segments of the zigzag line may be larger than 60 degrees and less than 180 degrees, and preferably may be in a range of (90 degrees, 180 degrees), more preferably (120 degrees, 180 degrees), further preferably (150 degrees, 180 degrees), for example, the angle α may be 160 degrees or 170 degrees. A range of a ratio λ of the total length of the segments of the zigzag line defining an angle therebetween to the unit length L may be larger than 1 and less than 2, preferably may be in a range of (1, 1.414), more preferably (1, 1.15), further preferably (1, 1.035), for example, the ratio λ may be 1.015 or 1.004. Each second trunk 28a and each wiring 28b abut against the first trunk 26a or the third branch 26c which are close thereto, thereby also being slightly bent state similar to the first trunk 26a, rather than a linear line.

It shall be indicated that the slightly bent state indicated in the sixth embodiment is also available for the above first to fourth embodiments, and a person skilled in the art can alter the above embodiments under the teaching of the sixth embodiment to also realize the slightly bent state; besides, the bending also may be unsymmetrical within the unit length L indicated in the figure, which will not be unnecessarily listed herein in detail.

Moreover, as to the shapes of the first and second electrodes, a person skilled in the art shall understand that there also may be other different embodiments, for example, spiral shape, and it is also impossible to enumerate them in the present application. However, according to the description of the above embodiments, a person skilled in the art shall understand that it falls within the scope of protection of the capacitive touchscreen and the manufacturing method thereof of the present disclosure, as long as the method for manufacturing the capacitive touchscreen includes: providing a substrate; arranging a transparent and conductive nano-silver thin film having a sensing area on the substrate, the sensing area having a first side and a second side opposite to the first side; setting laser parameters so that laser is operable to change the transparent and conductive nano-silver thin film to be transparent and nonconductive in a non removal manner; setting movement parameters so that the laser is movable according to a path defined by the movement parameters; and enabling the laser to irradiate the sensing area to form nonconductive patterns in the sensing area, according to the laser parameters and the movement parameters, multiple transparent and conductive first electrodes and second electrodes being formed on the sensing area due to the nonconductive patterns isolating the first electrodes from the second electrodes, and other steps. Each of the first electrodes includes a first trunk extending from the first side toward the second side. Each of the second electrodes includes a second trunk and a wiring coupled to the second trunk, both the second trunk and the wiring extend from the first side toward the second side, and each of the second trunks cooperates with a corresponding first trunk to be operable to sense a touched position A person skilled in the art shall understand that it falls within the scope of protection of the capacitive touchscreen and the manufacturing method thereof of the present disclosure, as long as the capacitive touchscreen includes: a substrate and a nano-silver thin film arranged on the substrate, where the nano-silver thin film includes a sensing area. having a first side and a second side opposite to the first side. The sensing area further includes multiple transparent and conductive first electrodes and second electrodes, and transparent and nonconductive patterns located between the first and second electrodes to electrically isolate the first electrodes and second electrodes. Each of the first electrodes includes a first trunk extending from the first side toward the second side. Each of the second electrodes includes a second trunk and a wiring coupled to the second trunk, both the second trunk and the wiring extend from the first side toward the second side, and each of the second trunks cooperates with a corresponding first trunk to be operable to sense a touched position in tandem with the corresponding first trunk.

Figure 9:
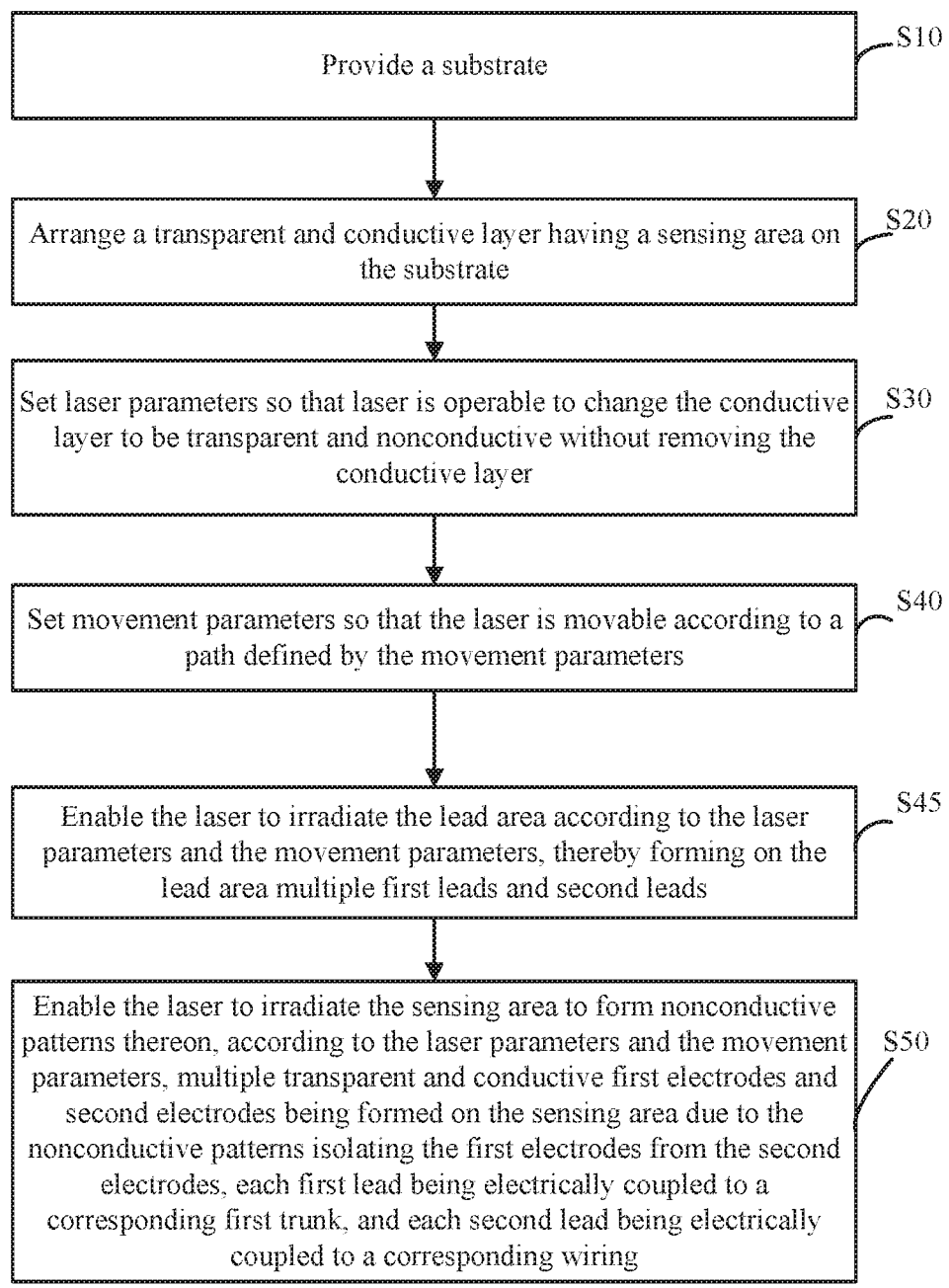
FIG. 9 is a flow chart of a method for manufacturing a capacitive touchscreen according to the second embodiment of the present disclosure.

Preferably, the nano-silver thin film 14 further includes a lead area 22 located at the periphery of the sensing area 20 as shown in FIG. 4. The method for manufacturing the capacitive touchscreen provided in the embodiments of the present disclosure further includes the following step, between Step S40 and Step S50, as shown in FIG. 9.

Step S45: the laser is enabled to irradiate the lead area 22 according to the laser parameters and the movement parameters, thereby forming on the lead area multiple first leads (not indicated) respectively and electrically coupled to the first trunk 26a, and second leads (not indicated) respectively and electrically coupled to the wirings 28b. The laser firstly starts to irradiate the nano-silver thin film 14 from the lead area 22 along the first direction, and directly enters the sensing area 22, so that the first lead and the corresponding first trunk 26a, and the second lead and the corresponding wiring 28b are fabricated in one time by the laser. Thus, in the process of manufacturing the whole capacitive touchscreen, the lead area and the sensing area of the touchscreen do not need to be manufactured through two processes as in the related art, but only one manufacturing process with the laser is needed, improving the manufacturing efficiency. This preferred step is used in the above first to sixth embodiments.

The above-mentioned descriptions are merely for preferable embodiments of the present disclosure and not used to limit the present disclosure. Any modifications, equivalent substitutions, improvements and so on, made within the spirit and principle of the present disclosure, shall be covered by the scope of protection of the present disclosure.

What is claimed is:

1. A capacitive touchscreen, comprising:
   a substrate;
   a transparent and conductive layer arranged on the substrate, the conductive layer comprising a sensing area, the sensing area having a first side and a second side opposite to the second side;
   multiple transparent and conductive first electrodes, each of the first electrodes comprising a first trunk extending from the first side toward the second side;
   multiple transparent and conductive second electrodes, each of the second electrodes comprising a second trunk and a wiring coupled to the second trunk, both the second trunk and the wiring extending from the first side toward the second side, each of the second trunks cooperating with a corresponding first trunk to be operable to sense a touched position; and
   transparent and nonconductive patterns located between the first electrodes and the second electrodes to electrically isolate the first electrodes from the second electrodes;
   the transparent and conductive layer further comprising a lead area adjacent to the sensing area, the lead area comprising a plurality of first leads respectively and electrically coupled to the first trunks, and a plurality of second leads respectively and electrically coupled to the wirings.

2. The capacitive touchscreen of claim 1, wherein each of the first electrodes further comprises multiple first branches extending outwardly from the first trunk, each of the second electrodes further comprises multiple second branches extending outwardly from the second trunk; each of the first branches and a corresponding second branch are arranged at an interval in a direction from the first side toward the second side.

3. The capacitive touchscreen of claim 2, wherein each of the first branches is corresponding to two of the second branches and is sandwiched between the two of the second branches.

4. The capacitive touchscreen of claim 2, wherein each of the second branches is corresponding to two of the first branches and is sandwiched between the two of the first branches.

5. The capacitive touchscreen of claim 1, wherein each of the first electrodes further comprises multiple first branches extending outwardly from the first trunk, and multiple third branches respectively extending from distal ends of corresponding first branches in a direction from the first side toward the second side; each of the second trunks is at least partially located between a corresponding third trunk and the first trunk.

6. The capacitive touchscreen of claim 5, wherein the first trunk, an adjacent first branch, and an adjacent third branch partially surround a corresponding second trunk, and a wiring is coupled to the corresponding second trunk through a gap between two adjacent third branches.

7. The capacitive touchscreen of claim 6, wherein each of the first branches and the corresponding third branch form a T shape.

8. The capacitive touchscreen of claim 1, wherein each of the first trunks extends from the first side toward the second side along a straight line, and each of the second trunks extends from the first side toward the second side along a straight line.

9. The capacitive touchscreen of claim 1, wherein each of the second trunks comprises a first end and a second end opposite to the first end, and a linear distance between two first ends of two adjacent second trunks in a first direction from the first side toward the second side along a straight line is an unit length L, and L is larger than 1 mm and less than 15 mm.

10. The capacitive touchscreen of claim 9, wherein L is larger than 4 mm and less than 7 mm.

11. The capacitive touchscreen of claim 10, wherein each of the first trunks comprises multiple V-shape bent portions, and the first trunk has a whole bent portion within the unit length L.

12. The capacitive touchscreen of claim 11, wherein a distance H between a highest point and a lowest point of each of the bent portions in a second direction perpendicular to the first direction is larger than 0 and less than 0.866 L.

13. The capacitive touchscreen of claim 12, wherein H is larger than 0 and less than 0.2887 L.

14. The capacitive touchscreen of claim 11, wherein each of the bent portions is symmetrical with respect to a second direction perpendicular to the first direction, and an angle α defined between segments of each of the bent portions is larger than 60 degrees and less than 180 degrees.

15. The capacitive touchscreen of claim 14, wherein a is larger than 150 degrees and less than 180 degrees.

16. The capacitive touchscreen of claim 11, wherein a ratio λ of a total length of the segments of each of the bent portions defining an angle therebetween to the unit length L is larger than 1 and less than 2.

17. The capacitive touchscreen of claim 16, wherein λ is greater than 1 and less than 1.15.

18. The capacitive touchscreen of claim 1, wherein each of the first leads and a corresponding first trunk extend from the first side toward the second side in a same straight line, and each of the second leads and a corresponding wiring extend from the first side toward the second side in a same straight line.

19. A method for manufacturing a capacitive touchscreen, comprising:
providing a substrate;
arranging a transparent and conductive layer having a sensing area on the substrate, the sensing area having a first side and a second side opposite to the first side;
setting laser parameters such that laser is operable to change the transparent and conductive layer to be transparent and nonconductive without removing the transparent and conductive layer;
setting movement parameters such that the laser is movable according to a path defined by the movement parameters;
enabling the laser to irradiate the sensing area to form nonconductive patterns thereon, according to the laser parameters and the movement parameters, a plurality of transparent and conductive first electrodes and second electrodes being formed on the sensing area due to the nonconductive patterns isolating the first electrodes from the second electrodes;
wherein, each of the first electrodes comprises a first trunk extending from the first side toward the second side; each of the second electrodes comprises a second trunk and a wiring coupled to the second trunk, the second trunk and the wiring extend from the first side toward the second side, and each of the second trunks cooperates with a corresponding first trunk to be operable to sense a touched position.

20. The manufacturing method of claim 19, wherein in the step of forming the nonconductive patterns, the laser is moved from the first side toward the second side along a straight line to form the first electrodes.

21. The manufacturing method of claim 20, wherein in the step of forming the nonconductive patterns, the laser is moved in a direction of the straight line to form the second electrodes.

22. The manufacturing method of claim 19, wherein in the step of forming the nonconductive patterns, the laser is moved from the first side toward the second side along a V-shape zigzag line to form the first electrodes and the second electrodes.

23. The manufacturing method of claim 19, wherein the conductive layer further comprises a lead area adjacent to the sensing area, and before the step of enabling the laser to irradiate the sensing area, the manufacturing method further comprises: enabling the laser to irradiate the lead area, to thereby forming a plurality of first leads respectively and electrically coupled to the first trunks and a plurality of second leads respectively and electrically coupled to the wirings on the lead area.

24. A capacitive touchscreen, comprising:
a substrate;
a transparent and conductive layer arranged on the substrate, the conductive layer comprising a sensing area, the sensing area having a first side and a second side opposite to the second side;
multiple transparent and conductive first electrodes, each of the first electrodes comprising a first trunk extending from the first side toward the second side;
multiple transparent and conductive second electrodes, each of the second electrodes comprising a second trunk and a wiring coupled to the second trunk, both the second trunk and the wiring extending from the first side toward the second side, each of the second trunks cooperating with a corresponding first trunk to be operable to sense a touched position; and
transparent and nonconductive patterns located between the first electrodes and the second electrodes to electrically isolate the first electrodes from the second electrodes;
each of the first electrodes further comprising multiple first branches extending outwardly from the first trunk; each of the second electrodes further comprising multiple second branches extending outwardly from the second trunk; each of the first branches and a corresponding second branch being arranged at an interval in a direction from the first side toward the second side.

* * * * *